(12) United States Patent
Winslow et al.

(10) Patent No.: US 10,444,254 B2
(45) Date of Patent: Oct. 15, 2019

(54) VIRTUAL TACHOMETERS BASED ON TIME SERIES FILTERING

(71) Applicant: Sikorsky Aircraft Corporation, Stratford, CT (US)

(72) Inventors: Christopher L. Winslow, Trumbull, CT (US); Biqing Wu, Vancouver, WA (US); Mark W. Davis, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 43 days.

(21) Appl. No.: 15/534,887

(22) PCT Filed: Oct. 19, 2015

(86) PCT No.: PCT/US2015/056245
§ 371 (c)(1),
(2) Date: Jun. 9, 2017

(87) PCT Pub. No.: WO2016/099645
PCT Pub. Date: Jun. 23, 2016

(65) Prior Publication Data
US 2017/0336430 A1   Nov. 23, 2017

Related U.S. Application Data

(60) Provisional application No. 62/093,895, filed on Dec. 18, 2014.

(51) Int. Cl.
*G01P 3/48* (2006.01)
*G01H 1/00* (2006.01)
*G01P 15/00* (2006.01)

(52) U.S. Cl.
CPC ........... *G01P 3/4807* (2013.01); *G01H 1/006* (2013.01); *G01P 3/48* (2013.01); *G01P 15/00* (2013.01)

(58) Field of Classification Search
CPC .......... G01P 3/4807; G01P 3/48; G01P 15/00; G01H 1/006
See application file for complete search history.

(56) References Cited

U.S. PATENT DOCUMENTS

| | | | |
|---|---|---|---|
| 4,872,337 A | 10/1989 | Watts et al. | |
| 5,109,700 A | 5/1992 | Hicho | |

(Continued)

FOREIGN PATENT DOCUMENTS

JP   H027877 A   1/1990

OTHER PUBLICATIONS

Keller, J., et al., "Vibration Monitoring of a UH-60A Main Transmission Panetary Carrier Fault," the American Helicopter Society 59th Annual Forum, Phoenix, Arizona, 2003, pp. 1-11.

(Continued)

*Primary Examiner* — Toan M Le
(74) *Attorney, Agent, or Firm* — Cantor Colburn LLP

(57) ABSTRACT

A system and method for receiving a plurality of first inputs from a transducer, where the plurality of first inputs correspond to vibrations of a rotational machine, and filtering the plurality of first inputs to derive a frequency of interest. The system and method then generates a sinusoidal signal at the frequency of interest and a pulse train of one or multiple pulses per revolution at the frequency of interest from the sinusoidal signal. The system and method further identifies a first pulse at a zero crossing within the pulse train and counts zero crossings to define blocks of data for use in time synchronous averaging calculations.

15 Claims, 7 Drawing Sheets

(56) References Cited

U.S. PATENT DOCUMENTS

| | | | |
|---|---|---|---|
| 5,115,671 | A | 5/1992 | Hicho |
| 5,412,985 | A | 5/1995 | Garcia et al. |
| 5,744,072 | A | 4/1998 | Karliner |
| 6,298,728 | B1 | 10/2001 | Fekete et al. |
| 6,697,759 | B2 | 2/2004 | Saarinen et al. |
| 7,031,873 | B2 | 4/2006 | Song |
| 7,133,801 | B2 | 11/2006 | Song |
| 7,283,923 | B2 | 10/2007 | Barila et al. |
| 7,912,659 | B2 | 3/2011 | Luo |
| 8,132,459 | B2 | 3/2012 | Toga et al. |
| 2011/0098968 | A1 | 4/2011 | Srinivasa et al. |
| 2012/0029838 | A1 | 2/2012 | Hallman et al. |
| 2012/0065901 | A1* | 3/2012 | Bechhoefer ............ F03D 7/047 702/34 |
| 2013/0249445 | A1 | 9/2013 | Sumioka |

OTHER PUBLICATIONS

Notification of Transmittal of the International Search Report for application PCT/US2015/056245; International Filing Date: Oct. 19, 2015, Received Feb. 19, 2016; 7 pages.

P.D. McFadden and J.D. Smith, "An Explanation for the Asymmetry of the Modulation Sidebands about the Tooth Meshing Frequency in Epicyclic Gear Vibration," Proceedings of the Institution of Mechanical Engineers, Part C: Mechanical Engineering Science, 199(1), pp. 65-70, 1985.

Written Opinion of the International Searching Authority for application PCT/US2015/056245, International Filing Date: Oct. 19, 2015, Received Feb. 19, 2016; 6 pages.

Extended European Search Report for European Application No. 15870521.0; Date of Completion: Jul. 3, 2018; dated Jul. 13, 2018; 11 Pages.

Randall, R L: Shaft-Rotation Detector. Rotation is Deduced From a Subtle Component of Vibration, NTIS Tech Notes, US Department of Commerce. Springfield, VA, US, Jan. 1, 1991 (Jan. 1, 1991), p. 53, XP000383506, ISSN: 0889-8464 *the whole document*.

* cited by examiner

VIRTUAL TACHOMETERS BASED ON TIME SERIES FILTERING

CROSS REFERENCE TO RELATED APPLICATIONS

This application is a National Stage application of PCT/US2015/056245, filed Oct. 19, 2015, which claims the benefit of U.S. Provisional Application No. 62/093,895, filed Dec. 18, 2014, both of which are incorporated by reference in their entirety herein.

STATEMENT REGARDING FEDERALLY SPONSORED RESEARCH OR DEVELOPMENT

This invention was developed with government support with DARPA under Contract No. HR0011-04-C-0003. The government therefore has certain rights in this invention.

FIELD OF THE INVENTION

The subject matter disclosed herein relates generally to virtual tachometers, and to monitoring vibrations of any mechanical system having rotating components that distributes mechanical power from one or more source(s) to one or more end use(s) of that power via a virtual tachometer.

BACKGROUND OF THE INVENTION

Propulsion systems convert stored energy into mechanical work to drive one or more rotor systems. Energy (e.g., stored in chemical form as fuel) is supplied to an energy conversion device (e.g., a plurality of internal combustion engines such as a turbine engine, spark ignition engine, or compression ignition engine), which converts the energy into mechanical work. A drive system transmits mechanical work through a plurality of transmission mechanisms (e.g., main rotor gearbox(es), a tail rotor gearbox, intermediate gearbox(es), drive shafts, drive couplings, etc.) to drive thrust generating rotors.

In general, a physical tachometer is a device for measuring rotational speed of rotating machinery and generating multiple equally spaced pulses per revolution, both of which are often used for condition monitoring, fault diagnosis, and system reliability improvement of the plurality of transmission mechanisms. The use of physical tachometers presents challenges when used for condition monitoring of complex rotating machinery having many components, which may be spatially distributed, requiring speed changes throughout the system and multiple gearboxes. First, the use of a global tachometer for processing of dynamic or vibration data measured elsewhere in the plurality of transmission mechanisms can lead to system latencies and inaccuracies. Second, the integration of multiple tachometers can lead to expensive solutions with respect to monetary and weight penalty costs. Third, physical tachometer signals can be degraded due to various operational issues such as dirty environment or misalignment caused by incorrect installation or inadvertent misalignment during maintenance events. In addition, the introduction of multiple sensors can lead to overall aircraft reliability issues.

BRIEF SUMMARY OF THE INVENTION

In accordance with an aspect of the invention, a system and/or computing device configured to receive a plurality of first inputs from a transducer, the plurality of first inputs corresponding to vibrations of a rotational machine; filter the plurality of first inputs to derive a frequency of interest; generate a sinusoidal signal at the frequency of interest; generate a pulse train of one or multiple pulses per revolution at the frequency of interest from the sinusoidal signal; identify a first pulse at a zero crossing within the pulse train; and count zero crossings to define blocks of data for use in time synchronous averaging calculations.

In accordance with another aspect of the invention, a method that comprises receiving, by a computing device, a plurality of first inputs from a transducer, the plurality of first inputs corresponding to vibrations of a rotational machine; filtering, by the computing device, the plurality of first inputs to derive a frequency of interest; and generating a sinusoidal signal at the frequency of interest; generating a pulse train of one or multiple pulses per revolution at the frequency of interest from the sinusoidal signal; identifying, by the computing device, a first pulse at a zero crossing within the pulse train; and counting zero crossings to define blocks of data for use in time synchronous averaging calculations.

Technical function of the one or more claims described includes at least one virtual tachometer that detects small speed variations of any component of a rotating machine across individual revolutions with a very high accuracy, which improves machine condition indicators, improves machine reliability, and provides monetary and weight penalty cost savings, along with ease of implementation.

Other aspects, features, and techniques of the invention will become more apparent from the following description taken in conjunction with the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which like elements are numbered alike:

DETAILED DESCRIPTION

As indicated above, the use of multiple physical tachometers to monitor a complex mechanical rotating system can have several disadvantages, including monetary and weight penalty costs and inaccuracies when used for condition monitoring. Thus, what is needed is a system, method, and/or computer program product configured to provide at least one virtual tachometer that utilizes vibration sensor data to simulate a physical tachometer.

In general, embodiments of the present invention disclosed herein may include a condition monitoring system, method, and/or computer program product that computes and analyzes sensor data in the time-series domain to estimate local rotational speed of various shafts contained in a transmission drivetrain (e.g., main shaft in a gearbox, power extraction shaft from a gearbox, input shaft for a remotely located gearbox, etc.), and may operate without utilizing Fast Fourier Transforms. Further, the condition monitoring system, methodologies, and/or computer program product for complex rotating machinery often requires a high-fidelity data sampling pulse that is multiple of vibration frequencies of interest (e.g., shaft speed, gear-mesh frequency, bearing defect frequencies, etc.). Furthermore, the condition monitoring system, methodologies, and/or computer program product can establish a timing pulse that enables the monitoring and tracking of any moving component within the gearbox through shaft synchronous sampling of data.

For instance, because a multiplication factor is usually quite big, any small variation in rotating shaft speed can be projected into a big variation in the relevant frequency (e.g., gear-mesh frequency). In turn, the condition monitoring system, method, and/or computer program product can utilize a vibration waveform at a frequency relevant to any component as a virtual high speed tachometer whose expansion or compression indicates rotational speed changes within the gear box.

Figure 1:
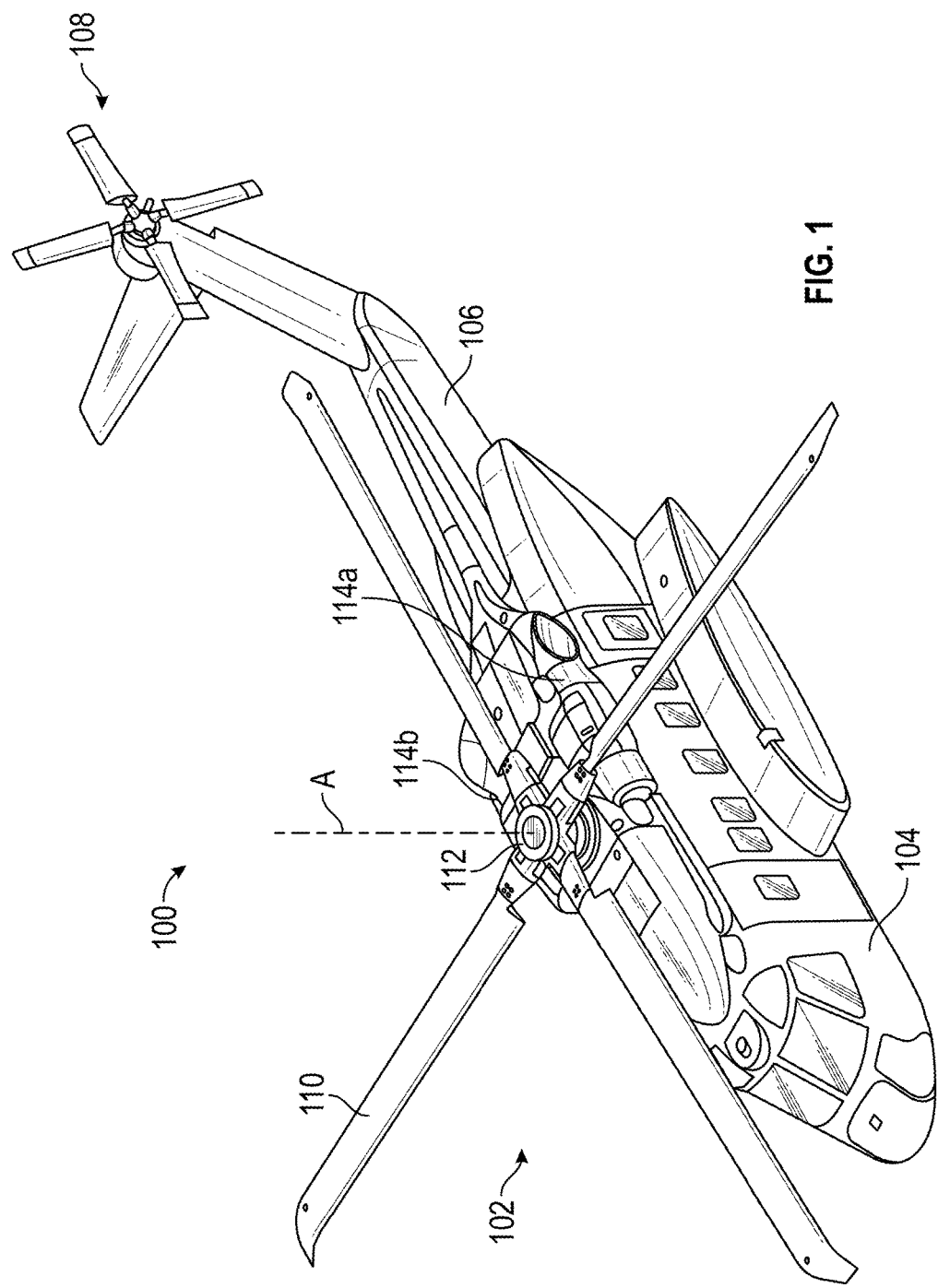
FIG. 1 depicts an exemplary rotary wing aircraft in accordance with an embodiment of the invention.

FIG. 1 schematically illustrates a helicopter or rotary wing aircraft 100 which includes a condition monitoring system (shown in FIGS. 2-4) that provides a virtual tachometer in accordance with an embodiment of the invention. As shown in FIG. 1, the aircraft 100 includes an airframe 104 having a main rotor assembly 102 and an extending tail 106 which mounts a tail rotor system 108, such as an anti-torque system, a translational thrust system, a pusher propeller, a rotor propulsion system, and the like. The main rotor assembly 102 includes a plurality of rotor blades 110 mounted to a rotor hub 112. The main rotor assembly 102 is driven about an axis of rotation A through a main rotor gearbox (e.g., item 201 of FIG. 2) by a multi-engine power plant system, here shown as two engines 114a and 114b. The engines 114a and 114b generate the power available to the aircraft 100 for driving a transmission system that is connected to the main rotor assembly 102 and the tail rotor system 108 as well as for driving various other rotating components to thereby supply power (e.g., electrical, hydraulic, pneumatic) for flight operations. Examples of the engines 114a and 114b may include any internal combustion engine, turbine engine, spark ignition engine, compression ignition engine, etc. Further, the engines 114a and 114b (along with other engines described below) may also include a diesel to electric engine system, a fuel cell system, etc., and thus the engines 114a and 114b should not be construed to any particular engine type.

In embodiments, the aircraft 100 may utilize a plurality of approaches for applying a virtual tachometer to any mechanical drive-train component (e.g., gearbox, shaft, bearings) of the aircraft 100. The approaches may be utilized through a sensor sub-system (shown in FIGS. 2-3) that receives vibration signals from one or more sensors onboard the aircraft 100 and provide notifications identifying condition monitoring, fault diagnosis, and system reliability information (or non-existence of the information) targeted to the systems or users responsible for the aircraft 100. Although a particular helicopter configuration is illustrated and described in the disclosed embodiments, other configurations and/or machines with single engine or multi-engine power plants, such as high speed compound rotary wing aircraft with supplemental translational thrust systems, dual contra-rotating, coaxial rotor system, tilt-rotors and tilt-wing, fixed wing, ground-based power plants or vehicles, and the like will also benefit from embodiments of the invention.

Figure 2:
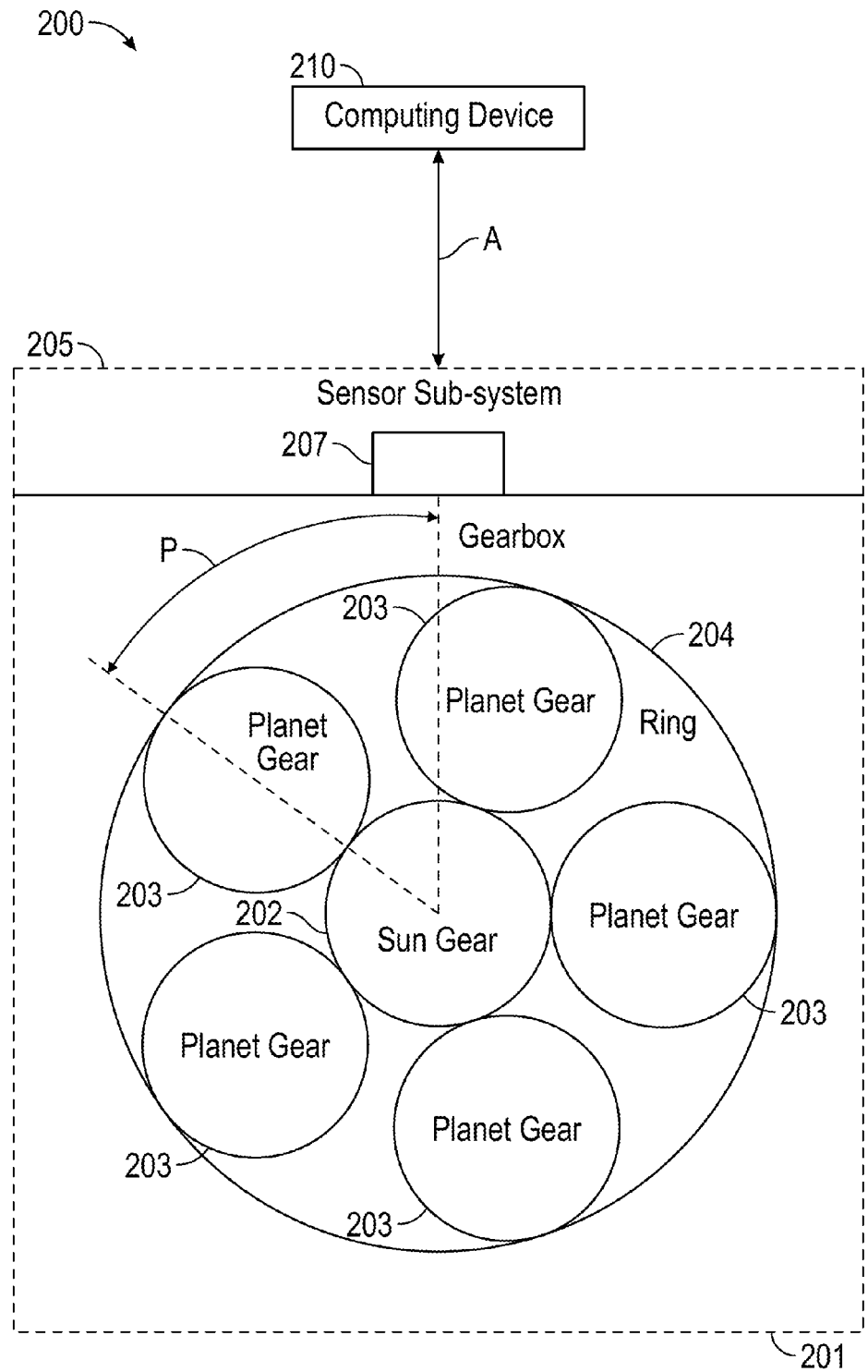
FIG. 2 depicts a condition monitoring system for a rotary wing aircraft in accordance with an embodiment of the invention.

FIG. 2 depicts a schematic view of a condition monitoring system 200 for detecting gear mesh frequencies of a planetary gear system e.g., in a gearbox 201 of the aircraft 100 (FIG. 1) in accordance with an embodiment of the invention. In general, the condition monitoring system 200 is configured to identify a timing pulse within sensor data, utilize that timing pulse to increase a signal to noise ratio of the sensor data, and calculate based on that signal to noise ratio to an extremely highly accuracy the frequencies of the gears, shock pulses, and other vibrations of the planetary gear system. In this way, these highly accurate frequencies are utilized in post processing by the condition monitoring system 200 for condition monitoring and fault diagnosis.

For example, the condition monitoring system 200 simulates a tachometer signal from vibrations of the gearbox 201 that are synchronous with a rotation of a main shaft of the gearbox 201 (e.g., virtual signal of a virtual tachometer). The virtual tachometer contains information about a rotational speed without the requirement of additional hardware that may be expensive and/or inaccurate. The virtual signal is utilized to estimate shaft speed and/or for dividing a vibration signal into individual revolutions in support of calculating a time synchronous averaged signal. The time synchronous averaged signal enhances vibrations synchronous with the main shaft rotation (e.g., such as gear mesh vibration) and suppresses external asynchronous vibration or broadband noise. Thus, the condition monitoring system 200 utilizes the shaft speed estimations and time synchronous averaging for gearbox 201 condition monitoring and fault diagnosis. Note that the generating of the virtual tachometer for planetary gear main shaft rotation in the gearbox 201 system is an example, and the condition monitoring system 200 may be utilized in/on other applications to rotating machinery, such as simpler gearboxes, compressors, turbines, fans, electric motors, etc.

FIG. 2 illustrates components of the gearbox 201 that include a sun gear 202 and five planetary gears (e.g., planet gears 203) orbiting around the sun gear 202, each of which is set in a ring gear 204. Further, the gearbox 201 is included in a sensor sub-systems 205 that utilizes a transducer 207, which is fixed on a casing of the gearbox 201, to sense or detect dominant vibrations sensed originating from a meshing of the planet gears 203 and the ring gear 204, along with other vibrations from a meshing of the sun and the planet gears. The transducer 207 may be any sensor that detects events or changes in quantities and provides a corresponding output, generally as an electrical or optical signal (e.g., such as an accelerometer that detects vibrations).

In this way, the condition monitoring system 200 may employ a single transducer 207 that detects all vibrations from all components of the gearbox 201 (e.g., as opposed to multiple physical transducers for multiple components). With respect to the vibrations in the gearbox 201, a frequency of interest may be a gear mesh vibration. The gear mesh vibration has line peaks at the gear mesh frequencies that occur at $f_m = mN_t f^s$, where m is the harmonic number, $N_t$ is the gear tooth number, and $f^s$ is the shaft frequency. While symmetrical sidebands of line peaks are caused by defects such as shaft imbalance, significant asymmetrical sidebands exist around the gear mesh frequencies for a planetary gear system (even for a perfectly manufactured gearbox). Thus, as the planet gears 203 rotate around the sun gear 202, a vibration transmission path from the meshing teeth to a position of the transducer 207 changes, introducing planet-pass modulation that causes sidebands around a gear mesh frequency. In addition to the planet-pass modulation, the gear mesh vibration generated by the planets has different phase delay when arriving at the transducer position, since the planets are distributed and equally spaced around the sun. The measured vibration in a fixed frame is a sum of vibration from each individual planet, which causes certain frequencies around a gear mesh frequency to be reinforced and remaining frequencies to be suppressed.

For example, the reinforced frequencies can be expressed in the Fourier Transform as seen in Equation 1.

$$f_{m,n}^r = (mN_t \pm n)f^s \text{ when } \frac{mN_t \pm n}{N_P} = \text{integer}, \quad \text{Equation (1)}$$

where m is the harmonic number, $N_t$ is the number of gear teeth, $N_P$ is the number of planets, $f^s$ is the main shaft frequency. Further, for $N_t$=228, and $N_P$=5 around the fundamental meshing band m=1, the reinforced frequencies (or Regular Meshing Component, RMC, as opposed to Non-Regular Meshing Components caused by a gear fault) are defined by n= . . . −8, −3, 2, 7, . . . . The RMCs include a dominant frequency (usually the RMC closest to the meshing harmonic frequency $mN_t$) and several apparent frequencies that are $N_P$ (5) shaft order apart from each other. Further, due to complex configuration of multiple moving planets 203 in a planetary gear system (e.g., gear box 201), the gear mesh fundamental or harmonic is not just a pure line at the dominant frequency in the spectrum. It has sidebands that modulate the sinusoid of the dominant frequency. The performance of the virtual tachometer for a planetary gear system may be affected by the sidebands as well as external tonal and broadband noise that may be interleaved with the mesh fundamental or harmonic. Nevertheless, performance evaluation using real vibration data collected from seeded fault testing of a planetary gear system shows that the simulated tachometer tracks the rotational speed with an accuracy that is comparable to those of real 1-pulse/revolution or high-speed tachometers. Thus, the condition monitoring system 201 can replace or mitigate the degradation of physical tachometers in vibration analysis for machine fault condition monitoring.

Figure 3:
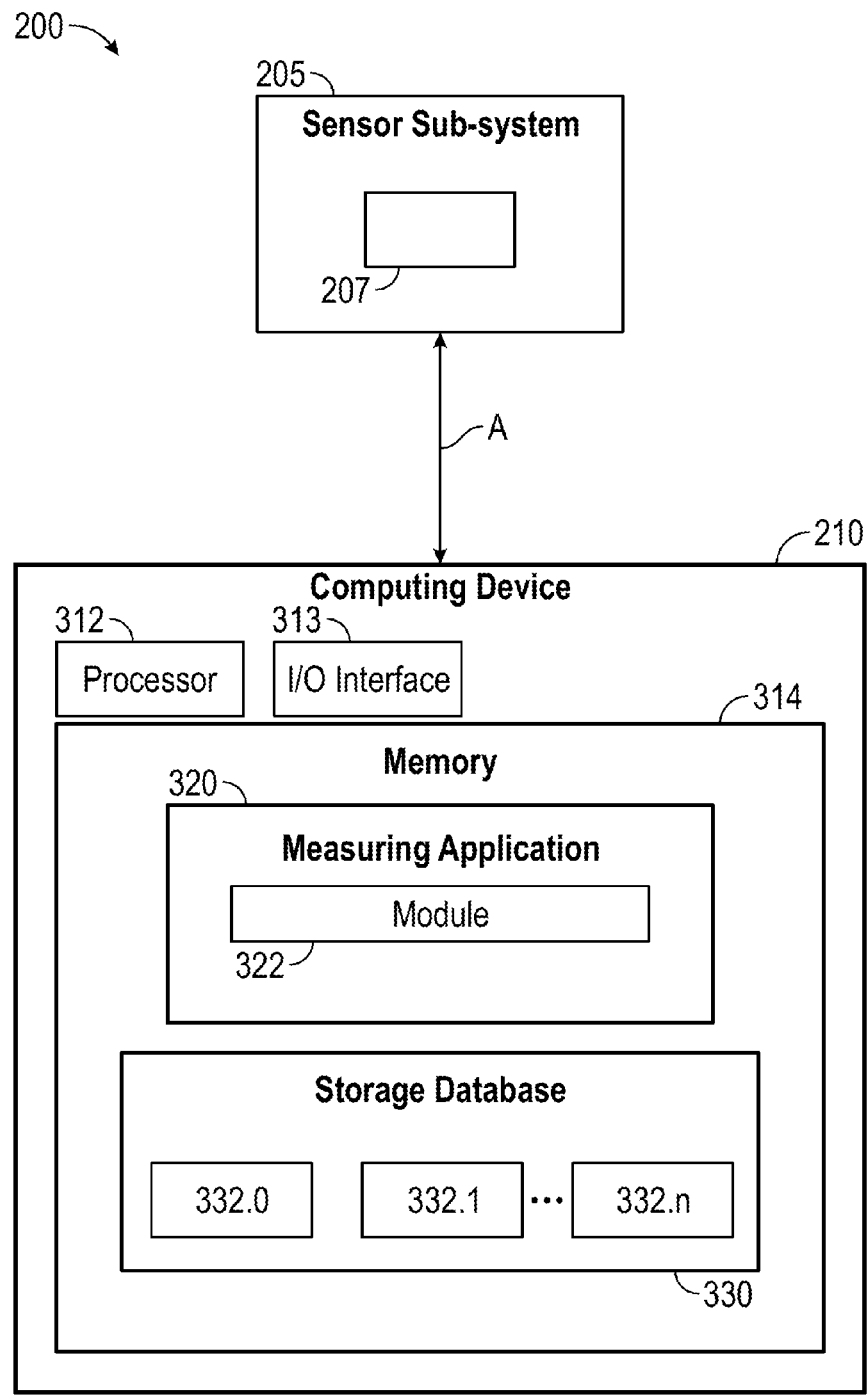
FIG. 3 illustrates a sensor sub-system and computing device schematic configured to provide a condition monitoring process.

The vibrations are then transmitted from the sensor sub system 205 to a computing device 210 for further processing, as illustrated by Arrow A. It is to be appreciated that the computing device 210 is schematically depicted and the location of the computing device 210 may vary. In particular, the computing device 210 may be integrated within the sensor sub-system 205 or may be remotely located in a wired or wireless communicative state with the sensor sub-system 205. FIG. 3 depicts a schematic view of the computing device 210 for processing the gear mesh frequencies of the gearbox 201 as detected and transmitted by the transducer 207 in accordance with an embodiment of the invention. The computing device 210 may include a processor 312, input/output (I/O) interface 313, and a memory 314. The memory 314 may further store a measuring application 320, which includes a module 322, and/or a storage database 330, which includes data 332.

The computing device 210 (e.g., a computing device as described below), which is configured to provide a condition monitoring process, where the processor 312 may receive computer readable program instructions from the measuring application 320 of the memory 314 and execute these instructions, thereby performing one or more processes defined by the measuring application 320. Also, the computing device 210 may utilize the storage database 330 to archive and store detected data received from the sensor sub-system 205 and/or data computed by the measuring application 320, as data 332.

The processor 312 may include any processing hardware, software, or combination of hardware and software utilized by the computing device 210 that carries out the computer readable program instructions by performing arithmetical, logical, and/or input/output operations. Examples of the processor 312 include, but are not limited to an arithmetic logic unit, which performs arithmetic and logical operations; a control unit, which extracts, decodes, and executes instructions from a memory; and an array unit, which utilizes multiple parallel computing elements.

The I/O interface 313 may include a physical and/or virtual mechanism utilized by the computing device 210 to communicate between elements internal and/or external to the computing device 210. That is, the I/O interface 313 may be configured to receive or send signals or data within or for the computing device 210. An example of the I/O interface 313 may include a network adapter card or network interface configured to receive computer readable program instructions from a network and forward the computer readable program instructions, original records, or the like for storage in a computer readable storage medium (e.g., memory 314) within the respective computing/processing device (e.g., computing device 210).

The memory 314 may include a tangible device that retains and stores computer readable program instructions, as provided by the measuring application 320, for use by the processor 312 of the computing device 210.

The measuring application 320 ("application 320") comprises computer readable program instructions configured to receive and respond to detected data from the sensor sub-system 205 and/or user inputs instructing the application 320 to operate in a particular manner. The application 320 includes and is configured to utilize a module 322 to perform measurement and self-calibrating algorithms that compute and analyze sensor data. The module 322 comprises computer readable program instructions configured to process sensor data. For instance, the module 322 comprises computer readable program instructions configured to process the detected dominant vibrations sensed from the meshing of the planet gears 203 and the ring gear 204, along with other vibrations from a meshing of the sun 202 and the planet gears 203, by the transducer 207. Further, module 322 may process the vibrations in the time-series domain to estimate shaft speed in the gearbox 201, and may operate without utilizing Fast Fourier Transforms.

Figure 4:
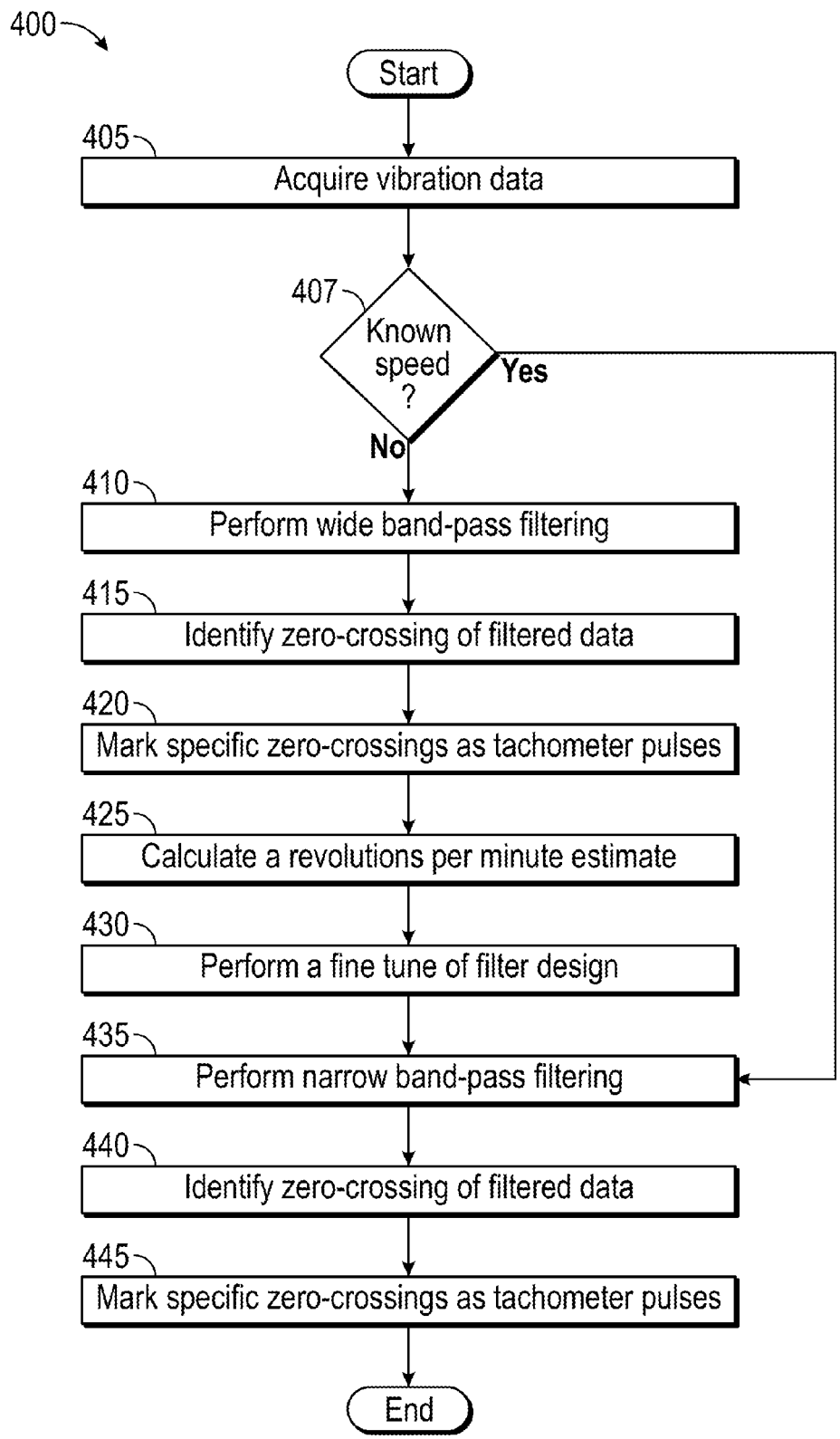
FIG. 4 illustrates a process flow of a condition monitoring system.
Figure 5:
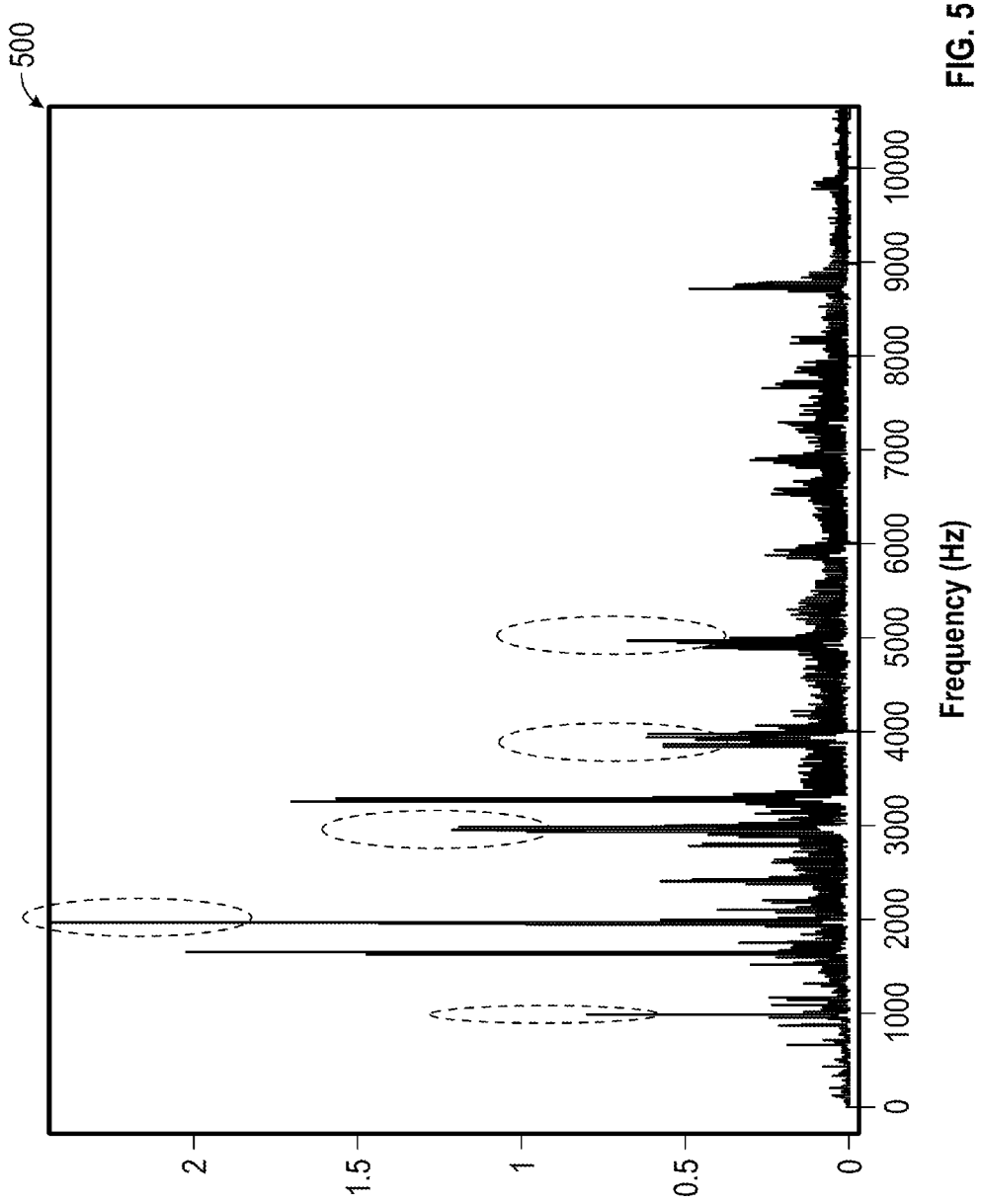
FIG. 5 illustrates a graph of an example spectrum of a snapshot of vibration data.

FIG. 4 illustrates a process flow 400 of simulating a high speed tachometer by the application 320 of the condition monitoring system 200. The process 400 begins at block 405 when the application 320 receives a plurality of first inputs indicating a vibration state of the gearbox 201 over time. That is, the plurality of first inputs corresponds to output signals from at least one transducer 207 of the sensor sub-system 205 (e.g., sensor data communicated between the transducer 207 and the I/O interface 313). The raw vibration data needs to be narrowed enough to isolate the frequency or frequencies of interest from what is typically a complex frequency spectrum. This is illustrated in FIG. 5, which shows an example spectrum 500 having a fundamental, $2^{nd}$, $3^{rd}$, $4^{th}$, and $5^{th}$ gear meshing harmonics as well as significant external tonal and broadband noise that is not of interest. A narrow filter pass-band (as seen below in block 435) bandwidth tends to lead to more accurate results, however, the use of a wide pass-band adds robustness to the simulated tachometer, if shaft rotating speed is not constant and can change even slightly causing the frequency of interest to shift outside a narrow pass-band. Thus, at decision block 407, the application 320 makes a determination as to which filtering is needed. For instance, based on whether the speed is known by the computing device 210, the condition monitoring system can proceed as described below.

If the speed is not known (e.g., as indicated in by the 'No' arrow), then the process flow 400 proceeds to block 410 where a wide-band-pass filtering is performed by the application 320 on the plurality of first inputs. If the speed is known (e.g., as indicated in by the 'Yes' arrow), the process flow 400 proceeds to block 435, which is further described below. With respect to block 410, the degree to which the shaft speed varies determines how wide the filter pass-band bandwidth needs to be. Since a small change in the shaft speed can result in a large shift in the frequency of interest (e.g., gear mesh), a rough estimate of the shaft speed is utilized by the condition monitoring system 200 to appropriately configure the pass-band of the filter. While this could be provided by another mechanism within the condition monitoring system 200, a virtual tachometer with a wide filter pass-band is used to roughly estimate the shaft speed in the present example.

Next, at block 415, the application 320 identifies at least one zero-crossing (e.g., positive to negative or negative to positive) of the band-pass filtered signal from block 410, from which a zero-crossing counting is utilized to identify a certain number of cycles of the filtered plurality of first inputs and mark a duration as one complete shaft rotation within the gearbox 201. That is, the application 320 marks each specific zero-crossing as a tachometer pulse at block 420, and the application 320 calculates an estimated shaft speed (e.g., revolutions per minute) at block 425. At block 430, the application 320 performs a fine tuning of the filter design so that any particular anomalies in the plurality of first inputs may be identified or isolated. Thus, the process flow 400 proceeds to block 435.

The process flow 400 proceeds to block 435 if the plurality of first inputs need to be further fine-tuned (e.g., after the sensor data has been processed via blocks 410-430 as described above) or if the speed is known (e.g., as indicated in by the 'Yes' arrow). In block 435, a narrow band-pass filtering is performed by the application 320. A narrow band is utilized since the speed is approximately known. If the vibration signal is passed through a narrow band-pass filter centered around a specific gear mesh frequency, a modulated sinusoidal signal whose frequency is the dominant frequency as expressed as a certain integer multiple of the shaft frequency is acquired. For example, a vibration signal is passed through a zero-phase band-pass filter whose pass-band is centered at a dominant frequency of a gear mesh fundamental or harmonic or other relevant vibration frequency. The band-pass filtering singles out a specific frequency component in the time domain that can be used as the virtual tachometer.

In addition, during filtering with respect to blocks 410 and 435, the phase delay needs to be zero or at least linear for the purposes of preserving the waveform shape of the frequency of interest. Distortion of the waveform may lead to inaccurate cycle counting and degrade the performance of the simulated tachometer. The condition monitoring system may utilize specially designed linear phase filters (e.g., Finite Impulse Response (FIR) filters) that, when applied to data, delay the output by a fixed number of samples. Moreover, the time shift of a linear-phase FIR filter is small enough to avoid the lag of a tachometer signal when the shaft speed changes.

Figure 6:
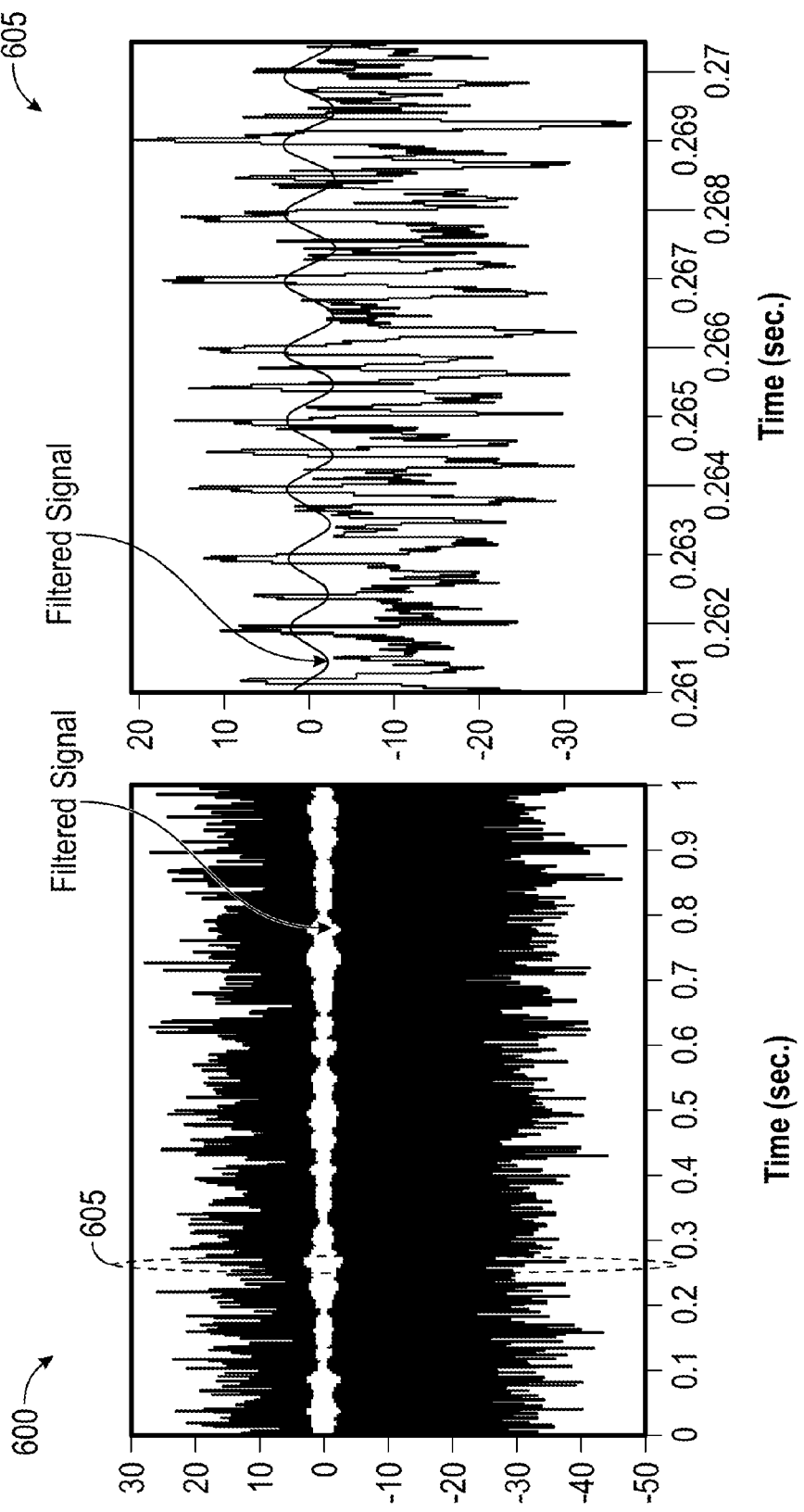
FIG. 6 illustrates graphs of raw vibration data and a filtered signal.

Next, the application 320 identifies at least one zero-crossing at block 440 (e.g., positive to negative or negative to positive), marks each specific zero-crossing as a tachometer pulse at block 445, and calculates refined shaft speed estimate (not shown). For example, FIG. 6 illustrates a graph 600 of raw vibration data and of a filtered signal. In FIG. 6, graph 605 zooms into a shorter duration segment of graph 600. The filtered signal of graph 605 also has a sinusoidal waveform with modulated amplitudes, such that a zero-crossing counting can be used to identify a certain number of cycles per one shaft revolution. The positive-to-negative zero crossings may be identified first, where the first zero crossing (or after discarding a small number of zero crossings) is marked as the first virtual tachometer pulse, and then, by counting the number of cycles (related to the dominant frequency) of the sinusoid, a complete revolution of the main shaft can be identified. For example, with respect to the gearbox 201, using the 2nd mesh harmonic to derive the simulated tachometer for every 455 zero crossings, a tachometer pulse is generated (note that in this example 455 sinusoidal cycles are counted instead of 456 (2*228), since the dominant frequency around the 2nd mesh harmonic is 455*Fs due to the planetary structure as explained above). The pulse indices are saved, in the database 330 as described below, and can be used to segment the vibration data into revolutions for time synchronous averaging operations.

Figure 7:
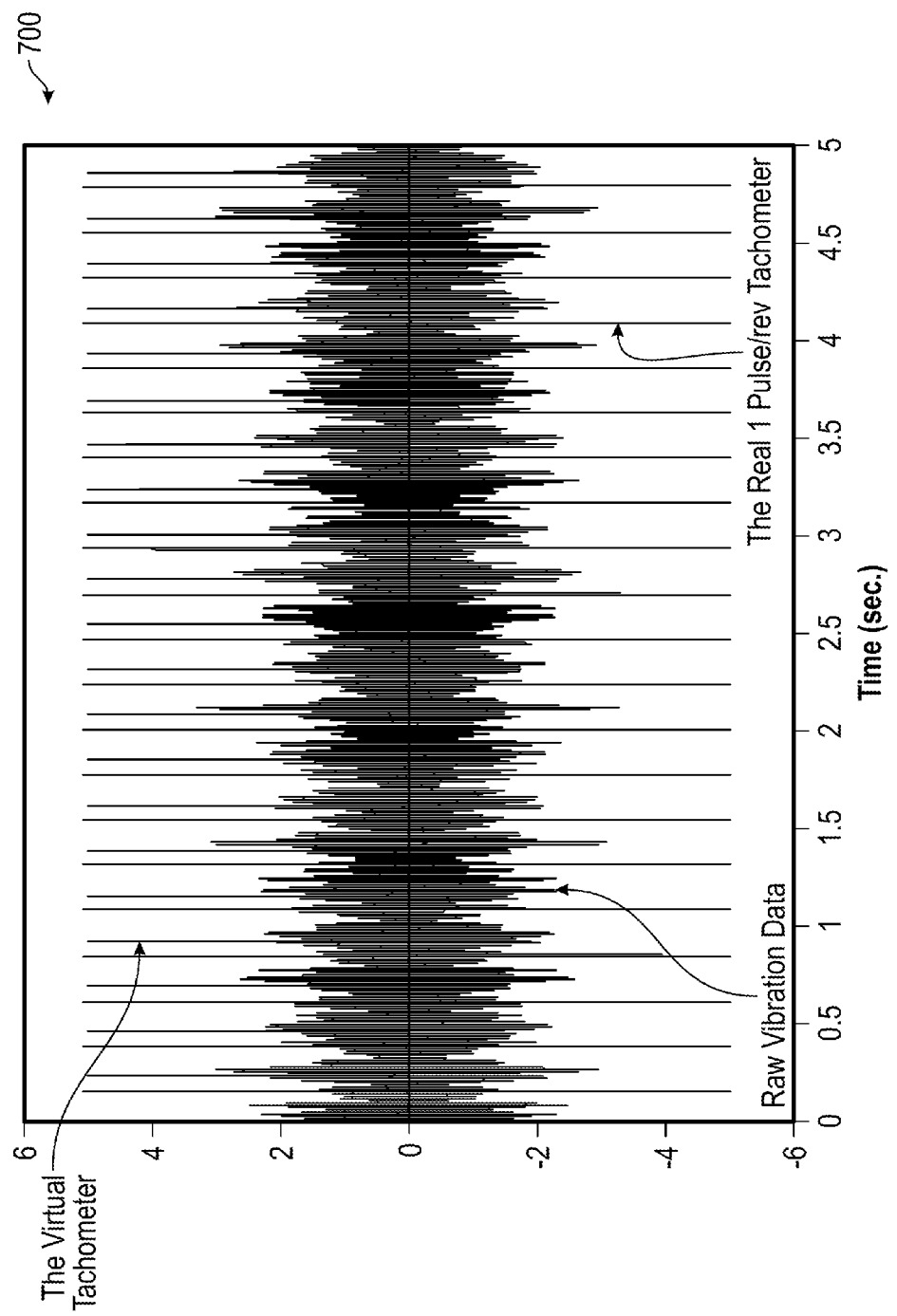
FIG. 7 illustrates a graph of raw vibration data, a real one pulse/revolution tachometer, and a virtual tachometer.

FIG. 7 illustrates a graph 700 of the raw vibration data, a 1-pulse/revolution signal from a physical tachometer, and a 1-pulse/revolution pulse signal resulting from the virtual tachometer and the process flow 400. The two tachometer signals do not overlap, since a zero crossing of the filtered signal is arbitrarily chosen as a starting point of the first revolution. A small shift of a tachometer is appropriate for time synchronous averaging calculation for which the primary requirement is to accurately identify a complete revolution of correct length, but not relative to any particular shaft azimuthal position.

At any time after the shaft speed estimate is calculated, the application 320 may output notifications (not shown) identifying condition monitoring, fault diagnosis, and system reliability information in accordance with further processing of the zero-crossing and shaft speed estimate. The notifications, in general, are identifying information (or non-existence of the information) targeted to the systems or users responsible for the aircraft 100 or other rotating machinery. Examples of notifications may include, but are not limited to, any combination of audio alerts (e.g., buzzers, bells, tones, telephone calls, cellphone calls, VoIP calls, voicemails, loudspeaker announcements, etc.), visual displays (e.g., flashing lights, display pop-ups), pager (e.g., SNPP), electronic mail (e.g., POP, IMAP, SMTP), desktop alerts (e.g., dialog, balloon, modal window, toast, etc.), instant messaging (e.g., IRC, ICQ, AIM, Yahoo! Messenger, MSN, XMPP, iMessage), text messaging (e.g., SMS), and the like. Then, the process flow 400 ends.

While single items are illustrated for the application 320 (and other items by each Figure), these representations are not intended to be limiting and thus, the application 320 items may represent a plurality of applications. For example, multiple measuring applications in different locations may be utilized to access the collected information, and in turn those same applications may be used for on-demand data retrieval. In addition, although one modular breakdown of the application 320 is offered, it should be understood that the same operability may be provided using fewer, greater, or differently named modules. Although it is not specifically illustrated in the figures, the applications may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 330 may include a database, such as described above, a data repository or other data store and may include various kinds of mechanisms for storing, accessing, and retrieving various kinds of data, including a hierarchical database, a set of files in a file system, an application database in a proprietary format, a relational database management system (RDBMS), etc., capable of storing data 332. The storage database 330 is in communication with the application 320 of and/or applications external to the computing device 210, such that information, data structures, and documents including data 332 may be collected and archived in support of the processes described herein (e.g., condition monitoring process). As illustrated in FIG. 3, the storage database 330 includes the data 332, illustrated as data structure 322.0 to data structure 332.$n$, where '$n$' is an integer representing a number of data structures archived by the storage database 330. Although one exemplary numbering sequence for the data 332 of the storage database 330 is offered, it should be understood that the same operability may be provided using fewer, greater, or differently implemented sequences. The storage database 330 may generally be included within the computing device 210 employing a computer operating system such as one of those mentioned above. The storage database 330 may also run independently of the computing device 210 and in communication with the application 320 and the sensor sub-system 205 via a network in any one or more of a variety of manners.

In operation, for example, the storage database 330 may collect and archive the data 332 received from the application 320 and the sensor sub-system 205. The storage database 330 may further communicate with other systems that may be internal or external to the condition monitoring system 200 to collect and archive data 332. The information may be any collection of data stored in a data structure. A data structure (e.g., the individual instances of the data 332) is a mechanism of electronically storing and organizing information and/or managing large amounts of information. Thus, the data 332 are illustrative of sensor outputs, calculation outputs, and historical information that are stored for use by the application 320. Examples of data structure types include, but are not limited to, arrays, which store a number of elements in a specific order; records, which are values that contains other values; hash tables, which are dictionaries in which name-value pairs can be added and deleted; sets, which are abstract data structures that store specific values without any particular order and repeated values; graphs and trees, which are linked abstract data structures composed of nodes, where each node contains a value and also one or more pointers to other nodes; and objects, which contain data fields and program code fragments for accessing or modifying those fields.

Thus, the condition monitoring system, method, and/or computer program product enables through a virtual tachometer accurate calculation of shaft speed and generation of a signal with multiple pulses per shaft revolution or revolution of frequency response of interest without the need for a physical tachometer or FFT, resulting in monetary and weight penalty cost savings, ease of implementation, and high accuracy. The condition monitoring system, method, and/or computer program product enables through the virtual tachometer an accommodation of varying rotational speed (e.g., not be constant and changing slowly over time). In fact, the virtual tachometer detects small speed variations across individual revolutions with a very high accuracy, which improves machine condition indicators and reliability.

In view of the above, the systems, sub-systems, and/or computing devices, such as condition monitoring system (e.g., sensor sub-system 205 and computing device 210 of FIG. 2), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, an embedded onboard aircraft system/architecture, a health and usage monitoring system/architecture, an integrated vehicle health management system/architecture, or some other computing system and/or device.

Computing devices may include a processor (e.g., a processor 312 of FIG. 3) and a computer readable storage medium (e.g., a memory 314 of FIG. 3), where the processor receives computer readable program instructions, e.g., from the computer readable storage medium, and executes these instructions, thereby performing one or more processes, including one or more of the processes described herein (e.g., condition monitoring process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, a condition monitoring system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of a condition monitoring system and method.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computing device, configured to:
    receive a plurality of first inputs from a transducer, the plurality of first inputs corresponding to vibrations of a rotational machine;
    wide band-pass filter the plurality of first inputs from the transducer;
    identify at least one zero-crossing of the wide band-pass filtered plurality of first inputs;
    mark each zero-crossing as a tachometer pulse to calculate an estimated shaft speed;
    narrow band-pass filter the plurality of first inputs from the transduced based on the estimated shaft speed to generate a sinusoidal signal at a frequency of interest;
    identify zero crossings in the sinusoidal signal;
    generate a pulse train of multiple pulses per revolution at the frequency of interest from the zero crossings;
    identify a first pulse at a zero crossing within the zero crossings; and
    count the zero crossings to define blocks of data for use in time synchronous averaging calculations.

2. The computing device of claim 1, wherein the rotational machine is a gearbox, and wherein the transducer is an accelerometer configured to detect the vibrations of the gear box and output the vibrations to the computing device.

3. The computing device of claim 1, wherein the frequency of interest corresponds to a component of the rotational machine.

4. The computing device of claim 1, further configured to:
    identify a shaft speed of the rotational device based on the identified zero-crossings.

5. The computing device of claim 1, further configured to:
    process the frequency of interest in support of condition monitoring of the rotational machine.

6. The computing device of claim 1, wherein the computing device is a high speed tachometer.

7. The system of claim 1, wherein the computing device is further configured to output a notification based on the estimated shaft speed to a system or user responsible for the rotational machine.

8. The system of claim 1, wherein the rotational machine is carried by an aircraft.

9. A method, comprising:
    receiving, by a computing device, a plurality of first inputs from a transducer, the plurality of first inputs corresponding to vibrations of a rotational machine;
    wide band-pass filtering on the plurality of first inputs;
    identifying, by the computing device, at least one zero-crossing of the wide-band filtered plurality of first inputs;
    marking, by the computing device, each zero-crossing as a tachometer pulse to calculate an estimated shaft speed;
    narrow band-pass filtering on the plurality of first inputs based on the estimated shaft speed to generate, by the computing device, a sinusoidal signal at a frequency of interest;
    identifying, by the computing device, zero crossing in the sinusoidal signal;
    generating, by the computing device, a pulse train of multiple pulses per revolution at the frequency of interest from the sinusoidal signal from the zero crossings;
    identifying, by the computing device, a first pulse at a zero crossing within the zero crossings; and
    counting, by the computing device, the zero crossings to define blocks of data for use in time synchronous averaging calculations.

10. The method of claim 9, wherein rotational machine is a gearbox and the transducer is an accelerometer, and further comprising,
    detecting the vibrations of the gearbox; and
    outputting the vibrations to the computing device.

11. The method of claim 9, wherein the frequency of interest corresponds to a component of the rotational machine.

12. The method of claim 9, further comprising:
    identifying a rotational speed of the rotational device based on the identified zero-crossings.

13. The method of claim 9, further comprising:
    processing the frequency of interest in support of condition monitoring of the rotational machine.

14. The method of claim 9, wherein the computing device is a virtual high speed tachometer.

15. The method of claim 9, further comprising outputting a notification based on the estimated shaft speed to a system or user responsible for the rotational machine.

* * * * *